United States Patent
Hanai et al.

(10) Patent No.: US 7,142,212 B1
(45) Date of Patent: Nov. 28, 2006

(54) IMAGE GENERATION SYSTEM AND PROGRAM

(75) Inventors: Naohito Hanai, Yokohama (JP); Masaki Iwabuchi, Yokohama (JP)

(73) Assignee: Namco Bandai Games, Inc., Tokyo (JP)

( * ) Notice: Subject to any disclaimer, the term of this patent is extended or adjusted under 35 U.S.C. 154(b) by 439 days.

(21) Appl. No.: 09/763,411

(22) PCT Filed: Jun. 2, 2000

(86) PCT No.: PCT/JP00/03588

§ 371 (c)(1),
(2), (4) Date: Apr. 2, 2001

(30) Foreign Application Priority Data

Jun. 25, 1999 (JP) .................................. 11/179850

(51) Int. Cl.
*G06T 15/70* (2006.01)
(52) U.S. Cl. ........................................................ 345/473
(58) Field of Classification Search ........ 345/581–593, 345/473, 474, 475, 955, 958, 959, 419, 420, 345/427; 463/2, 31; 434/19, 20, 21, 22, 434/23
See application file for complete search history.

(56) References Cited

U.S. PATENT DOCUMENTS

| | | | | |
|---|---|---|---|---|
| 5,150,899 A | * | 9/1992 | Kitaue ............................. | 463/2 |
| 5,731,819 A | * | 3/1998 | Gagne et al. ................ | 345/647 |
| 5,877,777 A | * | 3/1999 | Colwell ....................... | 345/473 |
| 5,918,238 A | * | 6/1999 | Hayashi ....................... | 715/526 |
| 6,054,992 A | * | 4/2000 | Gibson ........................ | 345/424 |
| 6,069,634 A | * | 5/2000 | Gibson ........................ | 345/424 |
| 6,271,856 B1 | * | 8/2001 | Krishnamurthy ............ | 345/581 |
| 6,417,854 B1 | * | 7/2002 | Isowaki et al. .............. | 345/473 |
| 6,417,861 B1 | * | 7/2002 | Deering et al. ............. | 345/589 |
| 6,456,289 B1 | * | 9/2002 | O'Brien et al. ............. | 345/473 |
| 6,509,902 B1 | * | 1/2003 | Pfister et al. ................ | 345/582 |
| 6,634,948 B1 | * | 10/2003 | Hayashi et al. ............... | 463/42 |

FOREIGN PATENT DOCUMENTS

| | | |
|---|---|---|
| EP | 0 797 172 A1 | 9/1997 |
| JP | 5-35846 | 2/1993 |
| JP | 8-305892 | 11/1996 |
| JP | 11-154242 | 6/1999 |

\* cited by examiner

*Primary Examiner*—Mark Zimmerman
*Assistant Examiner*—Enrique L. Santiago
(74) *Attorney, Agent, or Firm*—Oliff & Berridge, PLC

(57) ABSTRACT

The present invention provides an image generation system and a program embodied on an information storage medium or in a carrier wave which can generate an image in real-time of an object that distorts in accordance with an impact position, with a reduced quantity of data and computational load.

There is provided an image generation system which generates an image of an object formed by a primitive surface. It comprises an impact computation section (114) which computes an impact position at which an impact is imparted to the object and a distortion computation section (116) which performs computations for causing the distortion of the primitive surface in the vicinity of that impact position, to generate an image of the object formed by the primitive surface that has been distorted when the object has been subjected to an impact. If polygonal objects are used, at least one vertex that is to be moved by the impact is determined, that vertex is moved to a distortion point, and an image is generated of the object that includes that post-movement vertex.

28 Claims, 18 Drawing Sheets

IMAGE GENERATION SYSTEM AND PROGRAM

TECHNICAL FIELD

The present invention relates to an image generation system and a program embodied on an information storage medium or in a carrier wave.

BACKGROUND ART

In a three-dimensional game machine such as a gun-shooting game, an image might be created of the impact of a projectile such as a bullet on an unbreakable object formed of components such as steel plates, by way of example. In general, if an unbreakable object such as a steel plate is subjected to such an impact, it tends to become indented and distorted by that impact. On a game screen, however, this is often indicated by simply generating sparks at the location at which the shot landed.

There are game machines that can generate an image of the distortion of a steel plate caused by the impact of a bullet, but they simply substitute a pre-prepared distorted object after the shot has hit. They only show distortion of a predetermined shape, bearing no relationship to the location of the hit, and are thus not very realistic.

Another problem with this method is that, once a distortion has been caused by a first shot, the shape does not change further even if the object is hit by a number of subsequent shots, so that it is likely that the image representation will seem insufficient if an object is hit by a sequence of shots, such as during rapid-fire shooting by way of example.

DISCLOSURE OF THE INVENTION

The present invention was devised in the light of the above described problem in the prior art and has as an objective thereof the provision of an image generation system and a program embodied on an information storage medium or in a carrier waves which can generate images in real-time of an object that distorts in accordance with an impact position, with a reduced quantity of data and computational load.

(1) The present invention relates to an image generation system which generates an image of an object formed by a primitive surface, the image generation system comprising:

impact computation means which computes an impact position at which an impact is imparted to the object;

distortion computation means which performs computations for causing the distortion of the primitive surface in the vicinity of the impact position; and image generation means which generates an image of the object formed by the primitive surface that has been distorted after the impact was imparted to the object.

A computer-usable program in accordance with the present invention relates to a program embodied on an information storage medium or in a carrier wave, comprising information (a program) for implementing (executing) the previously described means. Another computer-usable program in accordance with the present invention comprises processing routines for implementing (executing) the above described means.

An object configured of primitive surfaces refers to an object that is formed of polygonal surfaces or free curved surfaces, by way of example.

With a game system using this image generation system, for example, the impact computation means preferably calculates the position of an impact imparted to the object in real-time, and the distortion computation means calculates the distortion of primitive surfaces in the vicinity of the impact position in real-time, so that an image of the object that has been distorted by the impact can be generated. This makes it possible to create real-time images of an object that is distorted in accordance with the impact position, when the input of a player has subjected the object to an impact.

Since this aspect of the present invention makes it possible to create images of an object that distorts in accordance with the position of an impact thereon, it is possible to provide an image generation system and a program embodied on an information storage medium or in a carrier wave that enable a more realistic representation of the distortion of the object.

(2) In the image generation system and the program embodied on an information storage medium or in a carrier wave in accordance with the present invention, the distortion computation means may comprise:

point-to-be-moved determination means which determines at least one surface-specifying point that is to be moved, based on the impact position, from among surface-specifying points that are distributed over the surface of the object or in the vicinity of the object for defining the primitive surface that forms the object;

means which computes at least one distortion point for specifying the shape of the primitive surface that is distorted by an impact; and means which causes the position of the thus-determined surface-specifying point to move to the distortion point; and the image generation means may specify the primitive surface based on the surface-specifying point that has been moved and generate an image.

A surface-specifying point refers to a vertex if the primitive surfaces are polygonal surfaces, or to a control point if the primitive surfaces are free curved surfaces, by way of example.

Note that the object could be divided into a plurality of primitive surfaces specified by the surface-specifying points before the impact occurs, or it could be divided into the plurality of primitive surfaces after the impact occurs.

This aspect of the present invention makes it possible to change the shape of primitive surfaces and represent the distortion of an object, by allowing an impact to move a surface-specifying point that is used for specifying primitive surfaces. Since this enables distortion in primitive surface units, it is possible to implement various distortions realistically in accordance with the impact position with a lower computational load.

(3) In the image generation system and the program embodied on an information storage medium or in a carrier wave in accordance with the present invention, the impact computation means may further comprise means which calculates the magnitude and direction of the impact imparted to the object; and the distortion point may be calculated from at least one of the impact position and the magnitude and direction of the impact.

This aspect of the present invention makes it possible to represent the distortion of an object that reflects the impact position and the magnitude and direction of the impact. It is therefore possible to provide an image generation system and a program embodied on an information storage medium or in a carrier wave that enable a more realistic representation of distortion.

(4) In the image generation system and the program embodied on an information storage medium or in a carrier wave in accordance with the present invention, the surface-specifying points may be distributed in a predetermined density.

If the distribution is at a predetermined density, the distribution could either be at random or arranged in a regular grid.

If the distribution is at a predetermined density, it becomes possible to represent distortion to a uniform degree, regardless of the position of the impact.

Note that if the degree of distortion is to be varied with location, it is preferable to distribute these surface-specifying points at a density that varies with location.

(5) In the image generation system and the program embodied on an information storage medium or in a carrier wave in accordance with the present invention, the surface-specifying points may be distributed in an arrangement that deviates in a random manner from grid points.

Distribution that deviates from grid points refers to a number of grid points and deviation to the vicinity of those grid points. Random deviation could either refer to deviation from all the grid points at random or the random designation of grid points used for this deviation.

If the surface-specifying points were to be disposed on a grid, impacts that occur along a row of these grid points could result in monotonous distortion, by way of example. However the present invention makes it possible to prevent monotonous distortion and create distortion in various shapes, by arranging the grid points at random.

(6) In the image generation system and the program embodied on an information storage medium or in a carrier wave in accordance with the present invention, the density of distribution of the surface-specifying points may be adjusted in accordance with the magnitude of distortion of the object due to an impact.

The magnitude of distortion due to an impact could be determined by the material of the object that is subjected to the impact or by the type of impact. If the magnitude is determined by the material of the object, for example, distortion will be small for a hard object of a material such as steel so the distribution of points can be made denser, but this distortion will be greater for a softer object of a material such as aluminum so this distribution of points can be made more sparse.

This aspect of the present invention makes it possible to adjust the magnitude of distortion of the object due to an impact in a simple manner, by adjusting the density of distribution of the surface-specifying points.

(7) In the image generation system and the program embodied on an information storage medium or in a carrier wave in accordance with the present invention, the point-to-be-moved determination means may determine a surface-specifying point in the vicinity of the impact position as a point to be moved.

A surface-specifying point in the vicinity of the impact position could be the surface-specifying point that is nearest to the impact position, by way of example. A plurality of surface-specifying points within a predetermined range from the impact point could also be determined as the points to be moved, in accordance with distance from the impact position.

This makes it possible to implement distortion in accordance with the impact position.

(8) In the image generation system and the program embodied on an information storage medium or in a carrier wave in accordance with the present invention, the surface-specifying points may be distributed in real-time after the object has been subjected to an impact.

Distributing the surface-specifying point in real-time after an impact has occurred makes it possible to reduce the image generation load before a distortion due to an impact. It is therefore possible to provide an image generation system and a program embodied on an information storage medium or in a carrier wave that enable an efficient reduction in the image generation load.

(9) In the image generation system and the program embodied on an information storage medium or in a carrier wave in accordance with the present invention, at least one of the range and density of distribution of the surface-specifying points may be determined in accordance with an impact that has been imparted to the object.

By determining the density of the surface-specifying points in real-time after an impact has occurred, it becomes possible to distribute the surface-specifying points at the optimal range and the optimal density corresponding to the impact. It is therefore possible to create optimal distortion images efficiently, with a reduced volume of data.

(10) Each of the image generation system and the program embodied on an information storage medium or in a carrier wave in accordance with the present invention may further comprise texture mapping computation means which performs computations necessary for mapping a texture onto the primitive surface that has been distorted by an impact; and the texture mapping computation means may perform texture mapping processing, using texture coordinates that corresponded to the surface-specifying point before movement, even when the surface-specifying point has been moved by an impact.

If texture mapping is performed on polygonal objects that use the surface-specifying point as a vertex, for example, it is possible to apply the texture coordinates that corresponded to that polygon vertex before the movement, unchanged to the vertex of the polygons after the movement caused by the impact.

If the same texture coordinates as those before the distortion are used, even when that surface-specifying point has been moved and the primitive surfaces have been distorted, the warping of the image during the application of a texture image will be increased. This makes it possible to emphasize the distortion of an object during image generation.

(11) Each of the image generation system and the program embodied on an information storage medium or in a carrier wave in accordance with the present invention may further comprise texture mapping computation means which performs computations necessary for mapping a texture onto the primitive surface that has been distorted by an impact; and the texture mapping computation means may comprise means which performs texture mapping processing, using texture coordinates which correspond to the impact position and are related to the surface-specifying point that has been moved by an impact.

The texture coordinates corresponding to the impact position refers to texture coordinates used for specifying a texture image within a texture space corresponding to an impact position, when an object on which a texture is mapped has been subjected to an impact. It is possible to prevent excessive distortion of the texture image and thus create a natural-looking warped image, by performing image generation such that the texture coordinates corresponding to the impact position are made to relate to that surface-specifying point after the movement.

(12) In the image generation system and the program embodied on an information storage medium or in a carrier wave in accordance with the present invention, image generation may be performed for an object formed by polygonal surfaces having the surface-specifying points as vertices.

This aspect of the present invention makes it possible to provide an image generation system and a program embodied on an information storage medium or in a carrier wave that enable the representation of individual distortions corresponding to impact positions on polygonal objects.

(13) Each of the image generation system and the program embodied on an information storage medium or in a carrier wave in accordance with the present invention, may further comprise means which performs image generation by using a polygonal object having the surface-specifying points as vertices, and performs shading processing in such a manner that the vicinity of the vertices after movement is darker, when the vertices have been moved by an impact.

When image generation is done by computer graphics, the brightness of an object is generally determined by light from a light sources and reflected components that strike the surfaces. If an object is distorted, for example, it would be difficult to see this distortion if there was little change in the darkness of the indented portion due to a change in reflectivity caused by the distortion. In this case, this aspect of the present invention makes it possible to create images that emphasize indentations due to distortion, by performing shading processing such that the neighborhood of the vertex is darker after the movement.

(14) In accordance with the present invention, there is provided an image generation system which generates an image of an object formed by a polygonal surface, the image generation system comprising:

object information storage means which stores information on the object formed by the polygonal surface having vertices that are a plurality of points distributed over the surface of the object at a predetermined density;

point-to-be-moved determination means that operates when an impact is imparted to the object, for determining at least one vertex to be moved, based on an imparted impact position;

means which causes the vertex to be moved to move, based on the magnitude and direction of the impact imparted to the object; and image generation means which generates an image of the object after a distortion caused by the impact, using the vertex that has been moved.

A computer-usable program in accordance with the present invention relates to a program embodied on an information storage medium or in a carrier wave, comprising information (a program) for implementing (executing) the previously described means. Another computer-usable program in accordance with the present invention comprises processing routines for implementing (executing) the above described means.

BEST MODE FOR CARRYING OUT THE INVENTION

Preferred embodiments of the present invention are described below with reference to the accompanying figures. Note that the present invention is described below as being applied to a gun-fighting game (shooting game) using a gun-shaped controller, but it is not limited thereto and thus can be applied to various other games.

1. Configuration

Figure 1:
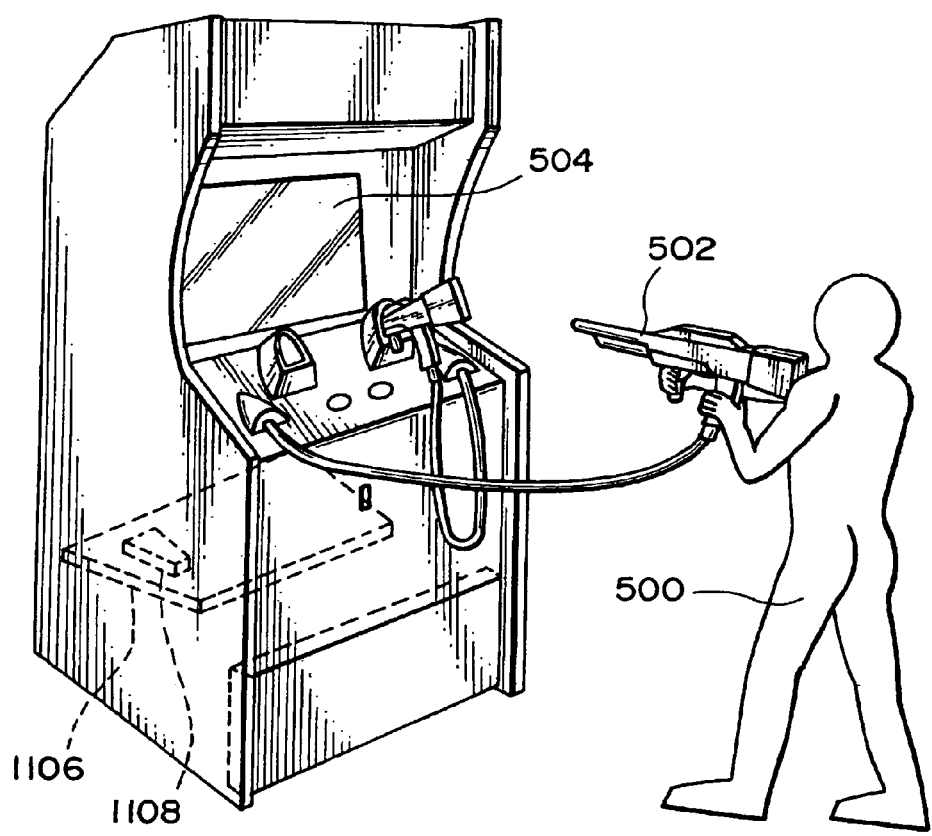
FIG. 1 shows an example of a configuration in which the embodiment of the present invention is applied to an arcade game system.

An example of the structure of this embodiment of the invention applied to an arcade game system is shown in FIG. 1.

A player 500 is provided with a gun-shaped controller (broadly speaking, a shooting device) 502 that is modeled on the shape of a real-life machine-gun. The player enjoys a gun-fighting game by aiming and shooting at targets such as enemy characters (broadly speaking, objects) that appear on a screen 504.

In particular, when a trigger is pulled on the gun-shaped controller 502 of this embodiment of the present invention, virtual shots are automatically fired at high speed. This makes it possible to give the player the feel of a virtual reality in which the player seems to be firing a real-life machine-gun.

Note that the position at which each shot lands (the shot-impact position) can be detected by providing an optical sensor within the gun-shaped controller 502 and detecting the shot by using that optical sensor to detect scanning light on a screen, or by firing light (a laser beam) from the gun-shaped controller 502 and using means such as a CCD camera to detect that light.

Figure 2:
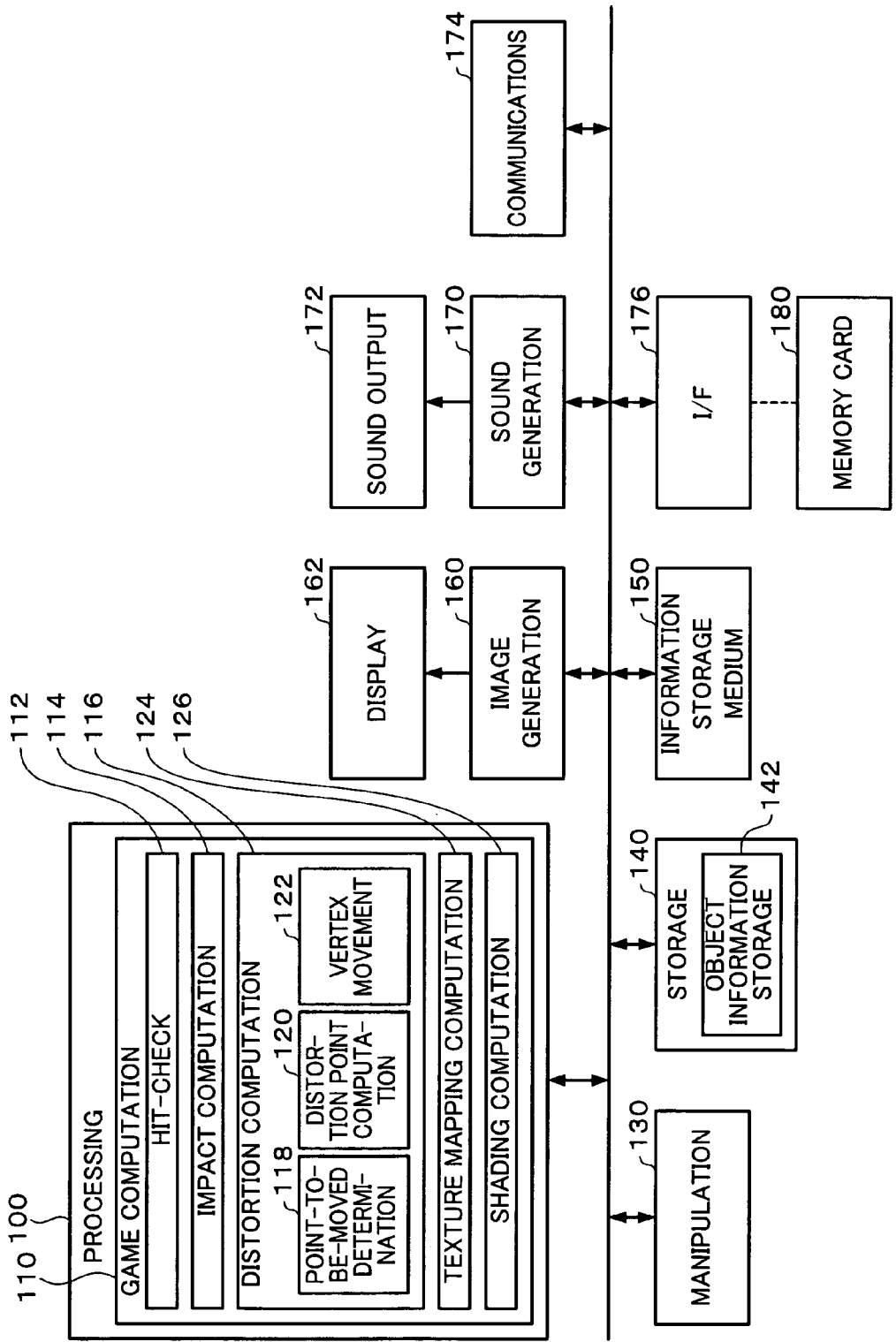
FIG. 2 shows a typical block diagram of the embodiment of an image generation system in accordance with the present invention.
Figure 3:
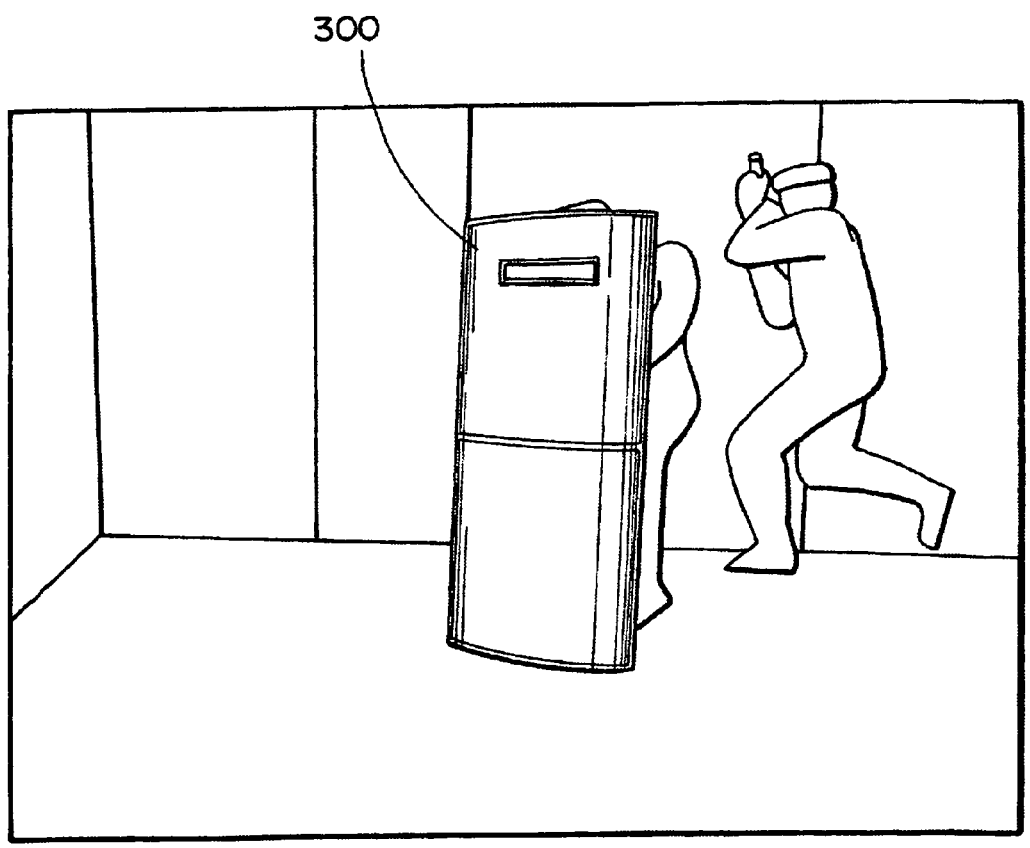
FIG. 3 shows a game image of the embodiment of the present invention.

A typical block diagram of an embodiment of this invention is shown in FIG. 2. Note that the embodiment shown in this figure comprises at least a processing section 100 (or the processing section 100 and a storage section 140, or the processing section 100, the storage section 140, and an information storage medium 150), but other blocks thereof (such as a manipulation section 130, an image generation section 160, a display section 162, a sound generation section 170, a sound output section 172, a communications section 174, an interface section 176, and a memory card 180) can be implemented by any other structural components.

In this case, the processing section 100 is designed to perform various types of processing, such as controlling the entire system, issuing instructions to the various blocks within the system, and performing game computations, where the functions thereof can be implemented by hardware such as a CPU (either CISC or RISC), a DSP, or an ASIC (such as a gate array), and by a given program (game program).

The manipulation section 130 is designed to enable the player to input operating data, where the functions thereof can be implemented by hardware such as gun-shaped controller 502 of FIG. 1, a joystick, and buttons.

The storage section 140 acts as a work area for components such as the processing section 100, the image generation section 160, the sound generation section 170, the communications section 174, and the interface section 176, where the functions thereof can be implemented by hardware such as RAM.

The information storage medium (a storage medium that enables the reading of information therefrom by a computer) 150 stores information such as a program and data, where the functions thereof can be implemented by hardware such as an optical disk (CD or DVD), a magneto-optical disk (MO), a magnetic disk, a hard disk, magnetic tape, or semiconductor memory (ROM). The processing section 100 is designed to execute the various types of processing of this invention, based on information such as the program and data stored in this information storage medium 150. In other words, the information storage medium 150 contains various types of information (program and data) for implementing the means (particularly the blocks comprised within the processing section 100) of this embodiment of the present invention.

Note that all or part of the information stored in the information storage medium 150 can be transferred to the storage section 140 at a suitable time, such as at power-on. The information stored in the information storage medium 150 comprises at least one type of information, such as program coding for executing the processing in accordance with the present invention, image information, sound information, shape information for display objects, table data, list data, player information, or information for instructing processing in accordance with the present invention.

The image generation section 160 is designed to create various images and output them to the display section 162 in accordance with instructions such as those from the processing section 100, where the functions thereof can be implemented by hardware such as an image generation ASIC, CPU, or DSP, as well as a given program (image generation program) and image information.

The sound generation section 170 is designed to create various sounds and output them to the sound output section 172 in accordance with instructions such as those from the processing section 100, where the functions thereof can be implemented by hardware such as a sound generation ASIC, CPU, or DSP, as well as a given program (sound generation program) and sound information (such as waveform data).

The communications section 174 is designed to provide various forms of control for executing communications to and from an external device (such as a host device or other image generation system), where the functions thereof can be implemented by hardware such as a communications ASIC or CPU and a given program (communications program).

Note that the information used for implementing the processing of the present invention could also be distributed to the information storage medium 150 possessed by a host device (server), through a network and the communications section 174. The use of such an information storage medium in a host device (server) is comprised within the scope of this invention.

Some or all of the functions of the processing section 100 could equally well be implemented by the functions of the image generation section 160, the sound generation section 170, or the communications section 174. Alternatively, some or all of the functions of the image generation section 160, the sound generation section 170, or the communications section 174 could be implemented by the functions of the processing section 100.

The interface section 176 is designed to provide an interface for exchanging information to and from a memory card (broadly speaking, a portable information storage device comprising a hand-held game machine or the like) 180, where the functions thereof can be implemented by a slot into which a memory card can be inserted or a controller IC for reading and writing data. Note that if the exchange of information with the memory card 180 is implemented by using wireless means, such as infrared, the functions of the interface section 176 could be implemented by hardware such as a semiconductor laser and an infrared sensor.

The processing section 100 comprises a game computation section 110.

In this case, the game computation section 110 performs various types of game-related processing such as processing for accepting a coin (fee), processing for setting various game modes, processing for moving the game forward, processing for setting selection screens, processing for determining the position and angle (rotational angle about the X-, Y- or Z-axis) of an object (character or moving body), processing for determining the viewpoint position and line-of-sight angle, processing for reproducing or creating the motion of an object, processing for disposing an object within an object space, hit check processing, processing for calculating game results (achievements and score), processing for enabling a plurality of players to play in a common game space, or game-over processing, based on factors such as manipulation data from the manipulation section 130 and data and a game program from the memory card 180.

The game computation section 110 comprises a hit-check section 112, an impact computation section 114, a distortion computation section 116, a texture mapping computation section 124, and a shading computation section 126.

In this case, the hit-check section 112 performs hit-check processing to determine whether or not the player using a gun-shaped controller has hit an object. Note that it is preferable to use a simple object that approximates to the shape of the object when performing this hit check, to reduce the processing load.

The impact computation section 114 performs processing to compute the impact position on the object and the magnitude and direction of the impact.

The distortion computation section 116 comprises a point-to-be-moved determination section 118, a distortion point computation section 120, and a vertex movement section 122, to enable it to perform computations for causing the distortion of polygonal surfaces in the vicinity of the impact position.

The point-to-be-moved determination section 118 performs processing to determine at least one surface-specifying point that is to be moved by an impact, from among surface-specifying points that are distributed over the surface of the object in order to specify vertices of polygonal surfaces that form the object. Note that it is preferable to determine a surface-specifying point that is in contact with the impact position, as the point to be moved.

The distortion point computation section 120 performs processing to compute at least one distortion point that is to form a vertex of a polygonal surface distorted by the impact.

The vertex movement section 122 performs processing to cause the position of the vertex that was determined to be the at least one surface-specifying point, to move to at least one distortion point.

The image generation section 160 generates an image of a polygonal object that comprises the vertex of the surface-specifying point after it has moved when the object has been subjected to an impact.

The surface-specifying points that form a vertices of polygons are preferably distributed at a predetermined density. These surface-specifying points are also preferably distributed in real-time after the object has been subjected to an impact. Furthermore, processing to adjust the coarseness of the distribution of these surface-specifying points is preferably done in accordance with the magnitude of distortion of the object due to an impact.

The texture mapping computation section 124 performs computations necessary for mapping a texture onto a primitive surface that has been distorted by an impact. It could also perform computations necessary for texture mapping using texture coordinates that corresponded to each surface-specifying point before it moved, even if that surface-specifying point has been moved by an impact. It could further perform texture mapping processing, using texture coordinates which correspond to an impact position and are related to the surface-specifying point after a movement due to an impact.

The shading computation section 126 performs the processing necessary for shading, in such a manner that the vicinity of a vertex after a movement is darker when a vertex of a polygon has been moved by an impact.

Note that the image generation section 160 performs processing to generate an image of the object, which is configured of polygonal surfaces, that has been distorted, if the object has been subjected to an impact.

Note also that the image generation system in accordance with this embodiment of the invention can be applied both to games in which an individual player plays in single-player mode and to games in which a plurality of players play in multi-player mode.

When a plurality of players are playing, the game images and game sounds provided to those players could be created by using one terminal, or they could be created by a plurality of terminals connected together by means such as a network (data transfer lines or communications lines).

2. Characteristics and Operations of this Embodiment of the Invention

Figure 4:
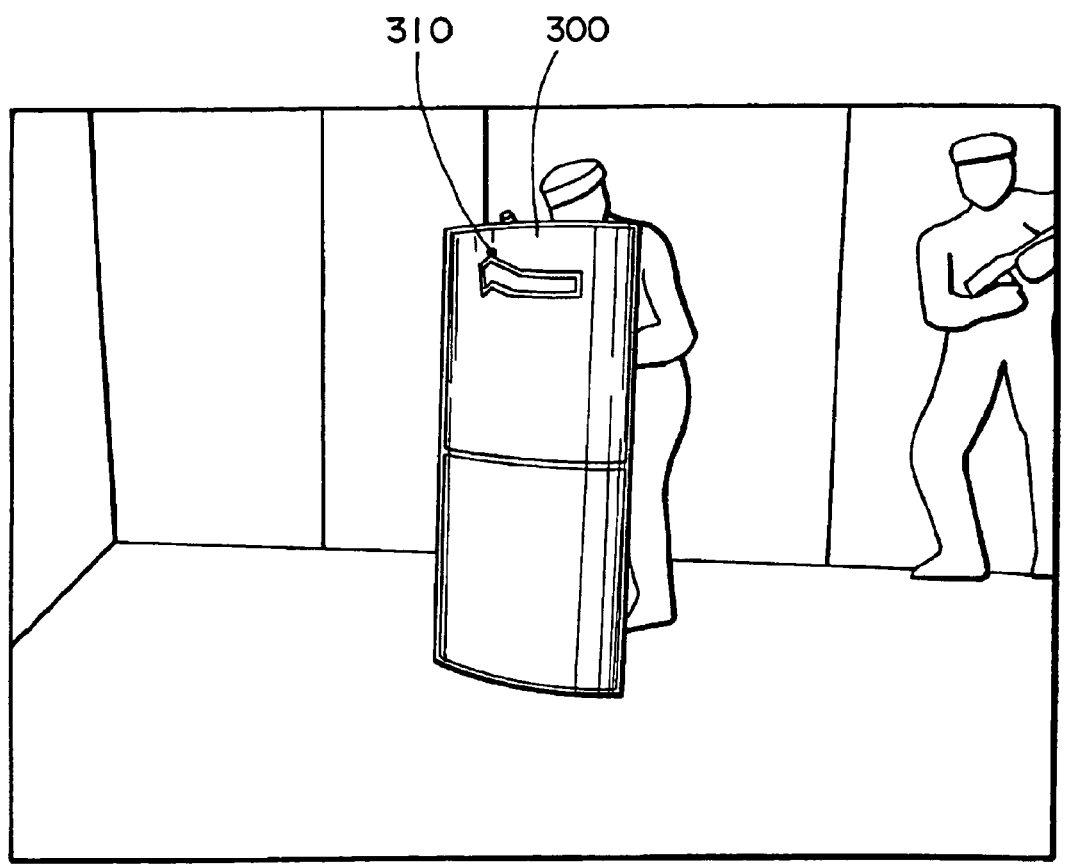
FIG. 4 shows another game image of the embodiment of the present invention.

Examples of game images in accordance with this embodiment of the invention are shown in FIGS. 3 to 6. Reference number 300 in FIG. 3 denotes a steel plate that will be subjected to distortion due to a bullet in accordance with this embodiment of the invention, in a state before it is distorted. Reference number 300 in FIG. 4 shows the steel plate 300 that is distorted after being hit by a bullet in the vicinity of reference number 310.

With the thus-configured embodiment of the present invention, an image can be generated in real-time of a steel plate that distorts to indicate the position at which a bullet has hit.

Figure 5:
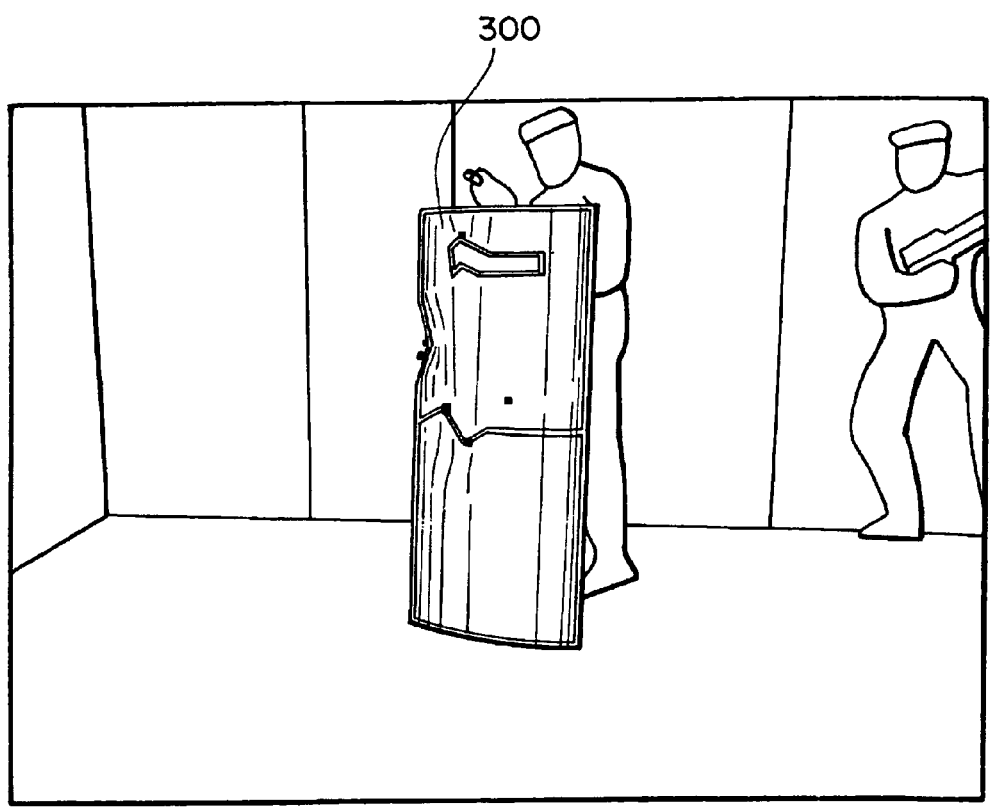
FIG. 5 shows a further game image of the embodiment of the present invention.
Figure 6:
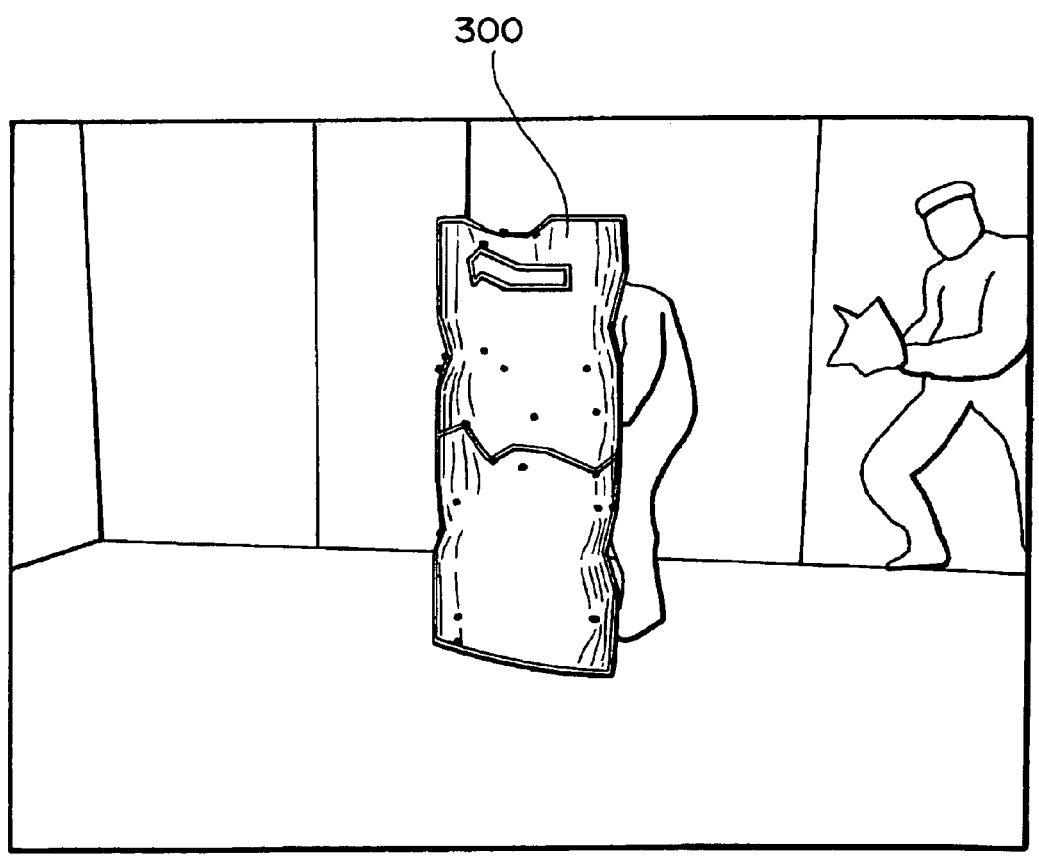
FIG. 6 shows a still further game image of the embodiment of the present invention.

FIG. 5 shows the situation of the steel plate 300 after it has been struck and has been distorted by more bullets, after being in the state shown in FIG. 4, and FIG. 6 shows the situation of the steel plate 300 after it has been struck by even more bullets and has distorted, that state shown in FIG. 5. The thus configured embodiment of the present invention makes it possible to reproduce realistic game images wherein distortion progresses as a number of shots hit during rapid-fire shooting.

Figure 7A:
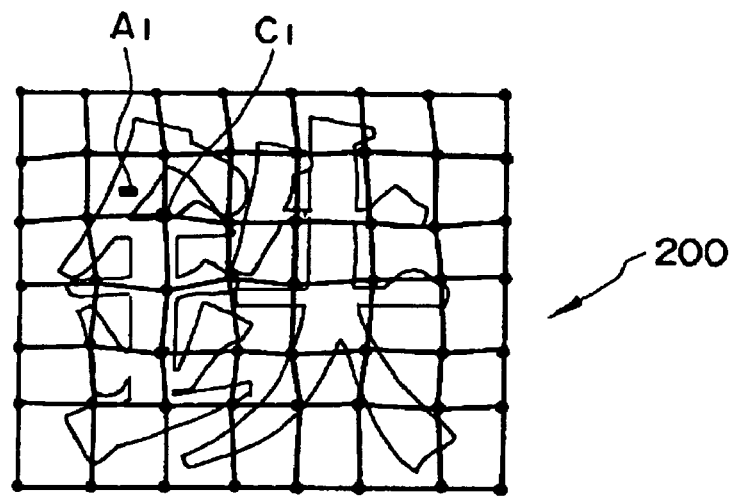
FIGS. 7A and 7B are illustrative of an example of distortion processing of a steel plate in accordance with the embodiment of the invention.
Figure 7B:
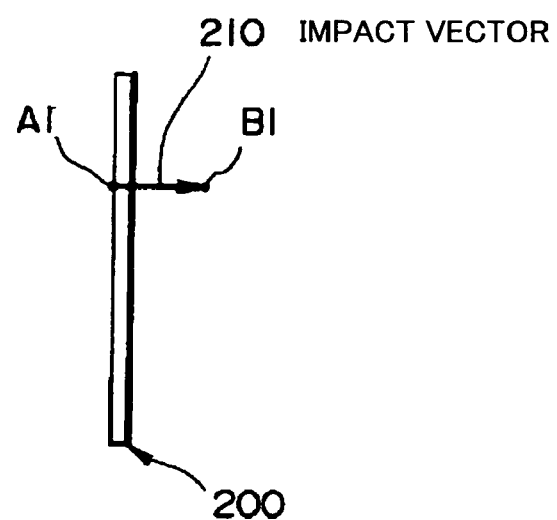
Figure 8:
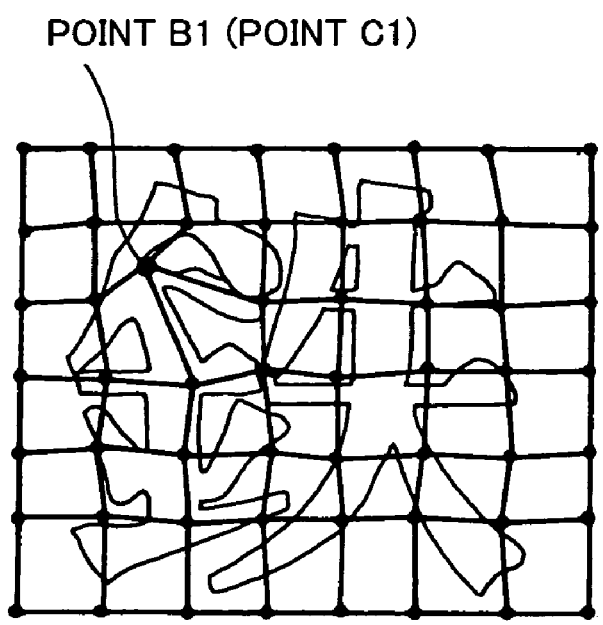
FIG. 8 is further illustrative of an example of distortion processing of a steel plate in accordance with the embodiment of the invention.
Figure 9:
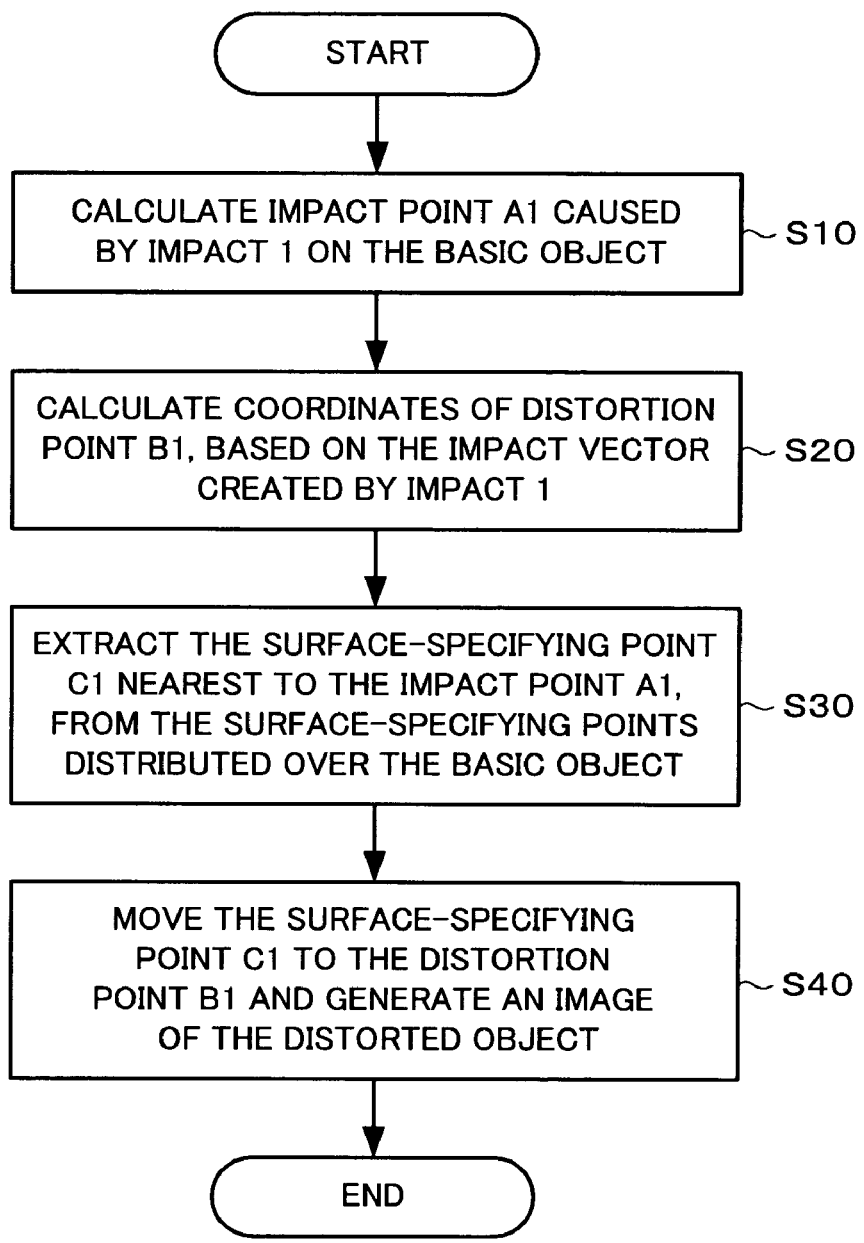
FIG. 9 is a flowchart of a detailed example of the processing in accordance with the embodiment of the invention.
Figure 10:
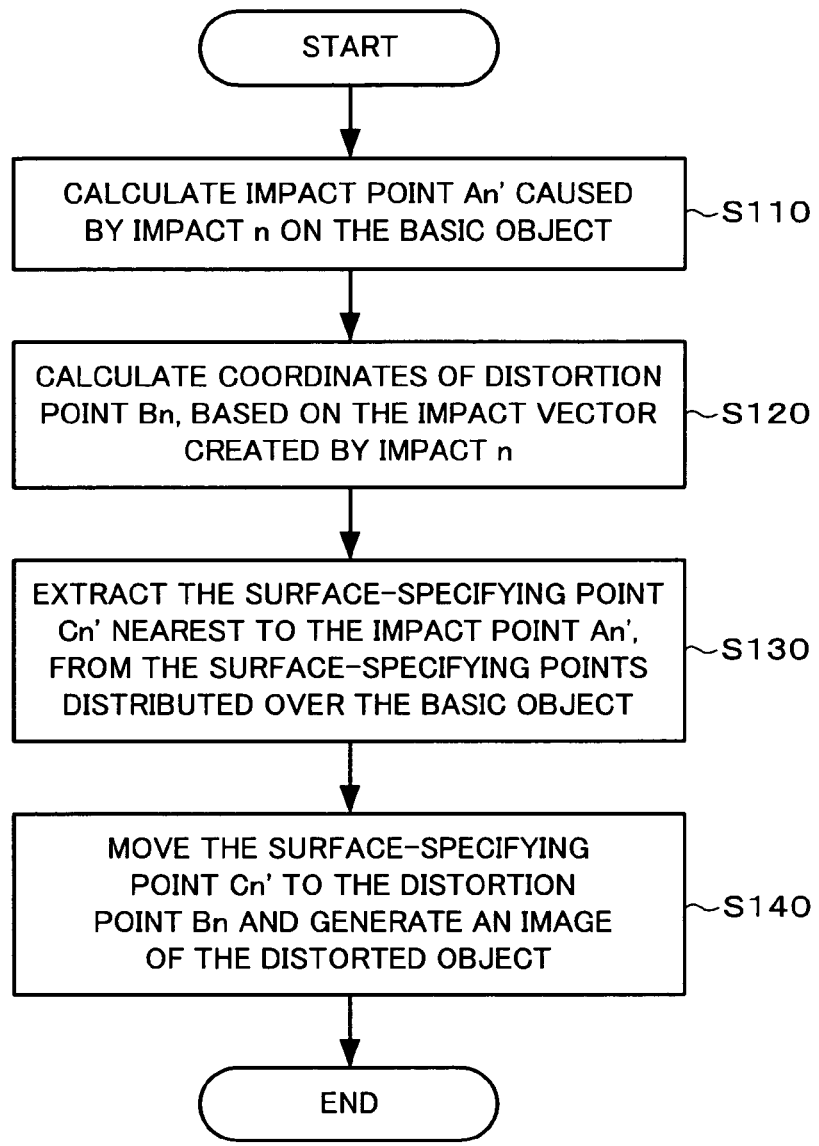
FIG. 10 is another flowchart of the detailed example of the processing in accordance with the embodiment of the invention.
Figure 11:
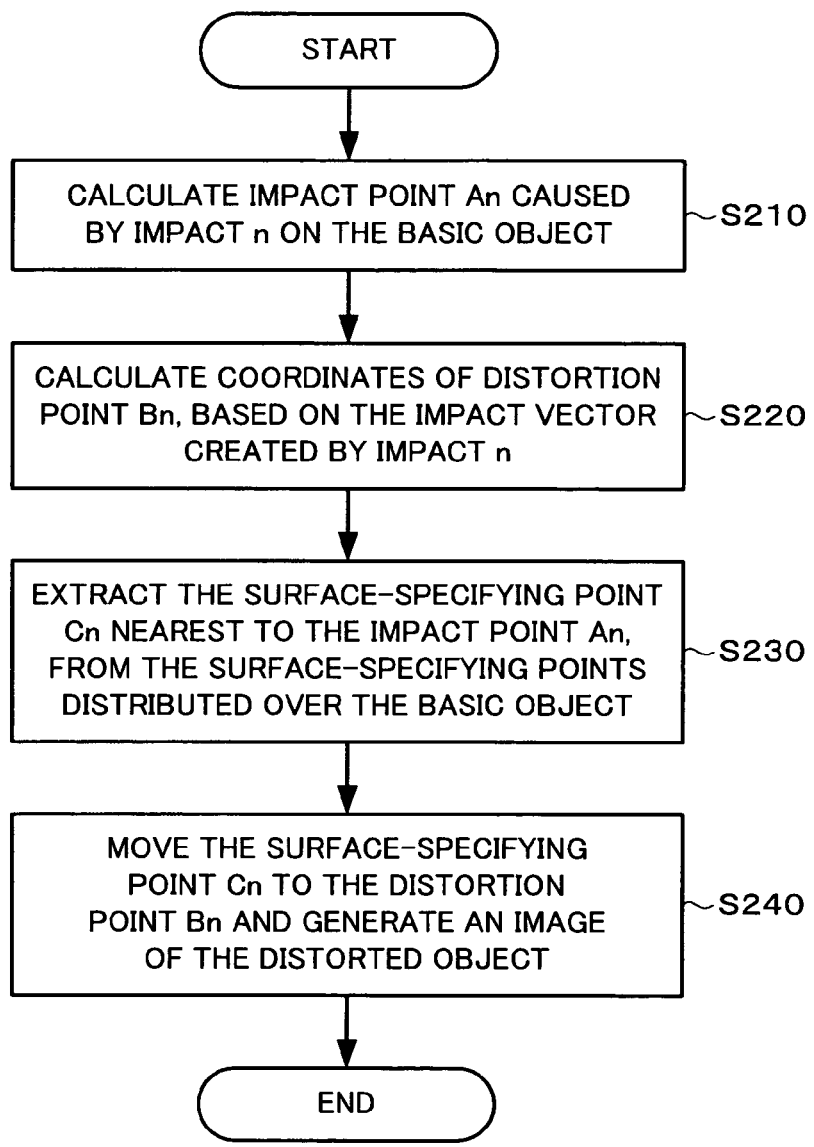
FIG. 11 is a further flowchart of the detailed example of the processing in accordance with the embodiment of the invention.

An example of the distortion processing that is performed when a steel plate is subjected to an impact in accordance with this embodiment of the invention is shown in FIGS. 7A, 7B, and 8. A flowchart illustrating this operating example in accordance with the present invention is shown in FIGS. 9 to 11.

FIG. 7A shows a steel plate 200 as seen from the front. As shown in this figure, this single steel plate 200 is divided into a plurality of surface-specifying points distributed on rectangular polygonal surfaces having edges on the order of 10 cm to 20 cm, which act as vertices. It is preferable that these surface-specifying points are displaced slightly from grid points, in a random manner. This is because it makes it possible to represent various different distortions, rather than simple indentation, when subjected to a series of shots (as an example of impacts).

Note that the object could be formed of a plurality of rectangular or triangular polygonal surfaces wherein surface-specifying points are determined beforehand to be vertices, or they could be divided in real-time when an impact occurs.

The description now turns to the distortion processing performed when the object is subjected to an initial impact (hereinafter called "impact 1"). The system calculates the position (hereinafter called "impact point") A1 at which impact 1 is imparted upon the object (hereinafter called "basic object") that has not yet been distorted by an impact (step S10). If it is assumed that the position at which the bullet strikes is A1, as shown by way of example in FIG. 7A, the position of A1 is calculated.

The system then calculates a point (hereinafter called "distortion point") B1 for specifying a distortion position based on an impact vector created by impact 1 (step S20). FIG. 7B shows the steel plate 200 as seen from the side. If the impact vector imparted by the striking of the bullet at the A1 point is assumed to be 210, by way of example, A1 is pushed by that impact vector and moves as far as the distortion point B1. The position of this distortion point B1 is determined by the position A1 that is subjected to the impact vector 210 and the magnitude and direction of the impact vector 210. If a shot has struck the A1 point from the front, as shown in FIG. 7B, the position to which the A1 point moves inward becomes the distortion point B1.

The system extracts the surface-specifying point C1 that is nearest to the impact point A1, from the group of surface-specifying points distributed over the basic object (step S30). If, for example, polygonal objects are formed beforehand by using the surface-specifying points as vertices, the vertex C1 that is nearest to the impact point A1 is extracted from the vertices of the polygonal objects.

The thus-extracted surface-specifying point C1 is moved to the distortion point B1, and an image of the distorted object is generated, based on the distortion point B1 instead of the surface-specifying point C1 (step S40).

With polygonal objects, for example, the image of the distorted object is generated from polygonal surfaces having vertices that are the points including the distortion point B1 instead of the vertex C1.

This makes it possible to generate an image of the steel plate that has been distorted by an impact, as shown in FIG. 8.

The description now turns to the distortion processing that occurs when an object that is already distorted is hit again by a bullet, in accordance with when the object is struck by an n-th impact (hereinafter called "impact n"), with reference to FIG. 10.

The system first calculates the position (hereinafter called "impact point") An' at which impact n strikes the object that has been distorted by impacts up to the (n−1)th impact (hereinafter called "distorted object") (step S110).

It then calculates a distortion point Bn, based on an impact vector created by impact n (step S120).

It also extracts the surface-specifying point cn' that is nearest to the impact point An', from the group of surface-specifying points distributed over the distorted object (step S130).

The thus-extracted vertex Cn' is moved to the distortion point Bn and an image of the distorted object is generated, based on the distortion point Bn instead of the surface-specifying point Cn' (step S140). With polygonal objects, for example, the image of the distorted object is generated from polygonal surfaces having vertices that are the points including the distortion point Bn instead of the vertex Cn' (step S140).

The above described processing makes it possible to generate realist images of the status of a steel plate that becomes gradually more distorted in accordance with shot positions as bullets hit it in sequences, as shown in FIGS. 5 and 6.

Note that the description of FIG. 10 dealt with a case in which the surface-specifying point that is to act as the point to be moved is extracted from a group of surface-specifying points for the distorted object every time an impact occurs (step S130 of FIG. 10), but the present invention is not limited thereto. The extraction of the surface-specifying point that is to act as the point to be moved by the n-th impact (by step S230 of FIG. 10) could equally well be done from the initial group of surface-specifying points that are distributed over the basic object that has not yet received an impact, as shown in FIG. 11 by way of example.

With this method, the position (hereinafter called "impact point") An at which impact n hits the basic object, when the object has been subjected to the n-th impact (hereinafter referred to as "impact n") is calculated, in contrast to the case shown in FIG. 10 (step S210).

A distortion point Bn is then calculated, based on the impact vector created by impact n (step S220).

The surface-specifying point Cn that is nearest to the impact point An is then calculated, from the group of surface-specifying points distributed over the basic object (step S230).

The thus-extracted vertex Cn is moved to the distortion point Bn and an image of the distorted object is generated, based on the distortion point Bn instead of the surface-specifying point Cn (step S240). With polygonal objects, for example, the image of the distorted object is generated from polygonal surfaces having vertices that are the points including the distortion point Bn instead of the vertex Cn (step S240).

This makes it possible to prevent huge distortions when neighboring areas are bathed in concentrated fire.

Note that the positions of A1, B1, C1, An, An', Bn, Cn, and Cn' could be calculated as coordinates within a coordinate system for the steel plate.

The description now turns to a method of mapping a texture on the distorted object, in accordance with this embodiment of the invention.

Figure 12A:
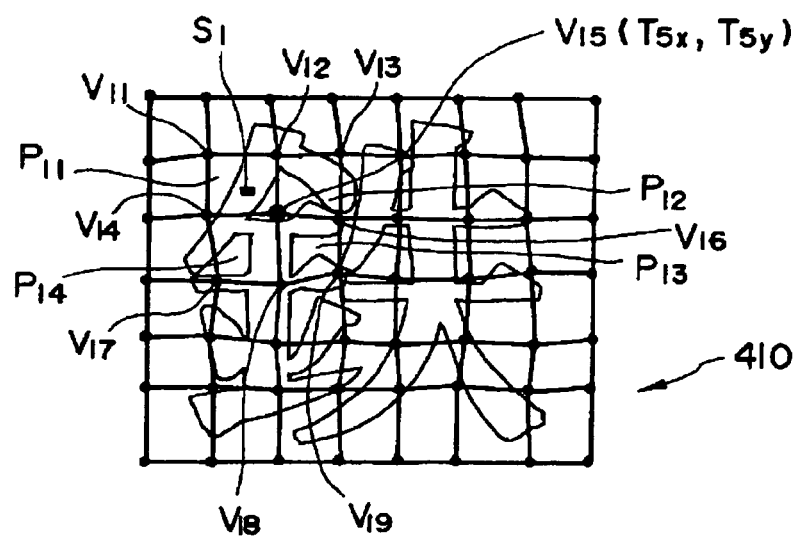
FIGS. 12A and 12B are illustrative of an example of the method used for mapping a texture onto a distorted object.
Figure 12B:
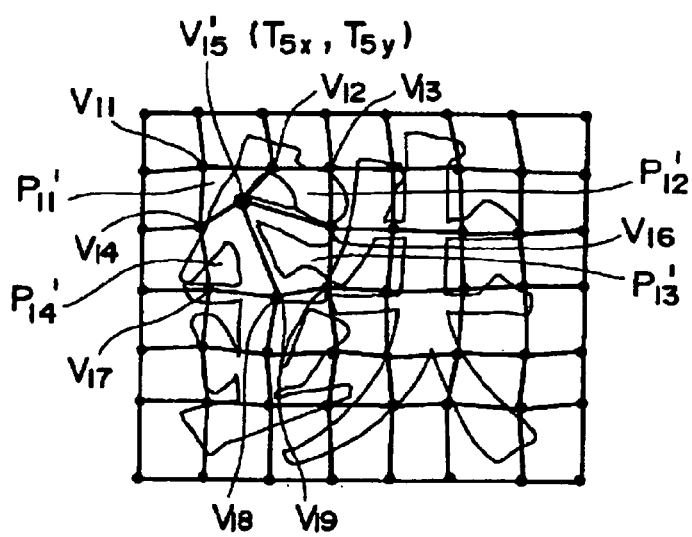

An example of this method of mapping a texture onto a distorted object is illustrated in FIGS. 12A and 12B. Reference number 410 in FIG. 12A shows a situation in which a texture image representing the Chinese character for "iron" has been mapped onto a plurality of divided polygonal objects.

$V_{11}$ to $V_{19}$ denote the vertices of the polygonal objects, $P_{11}$ denotes a polygonal surface having the vertices $V_{11}V_{12}V_{15}V_{14}$, $P_{12}$ denotes a polygonal surface having the vertices $V_{12}V_{13}V_{16}V_{15}$, $P_{13}$ denotes a polygonal surface having the vertices $V_{14}V_{15}V_{18}V_{17}$, and $P_{14}$ denotes a polygonal surface having the vertices $V_{15}V_{16}V_{19}V_{18}$.

When image generation is performed for mapping a texture onto polygonal objects as shown in this figure, this method defines texture coordinates for mapping in accordance with the vertices of each polygon. In this case, assume that texture coordinates $(T_{5x}, T_{5y})$ correspond to the vertex $V_{15}$ that is used in common by the polygons $P_{11}$ to $P_{14}$, by way of example (see FIG. 12A).

Assume that a point $S_1$ on the polygon $P_{11}$ has been subjected to an impact and the vertex $V_{15}$ has moved to a distortion point $V_{15}'$. With this embodiment of the present invention as described above, distorted polygonal objects are generated, using $V_{15}'$ as a new vertex. The texture mapping that is performed on the distorted polygons $P_{11}$ to $P_{14}$ in this case, using the texture coordinates $(T_{5x}, T_{5y})$ having the pre-movement vertex $V_{15}$ as the texture coordinates corresponding to $V_{15}'$, are shown in FIG. 12B. Since the texture image is greatly distorted, this makes it possible to represent the distortion of an object due to an impact in a more visual manner.

Figure 13A:
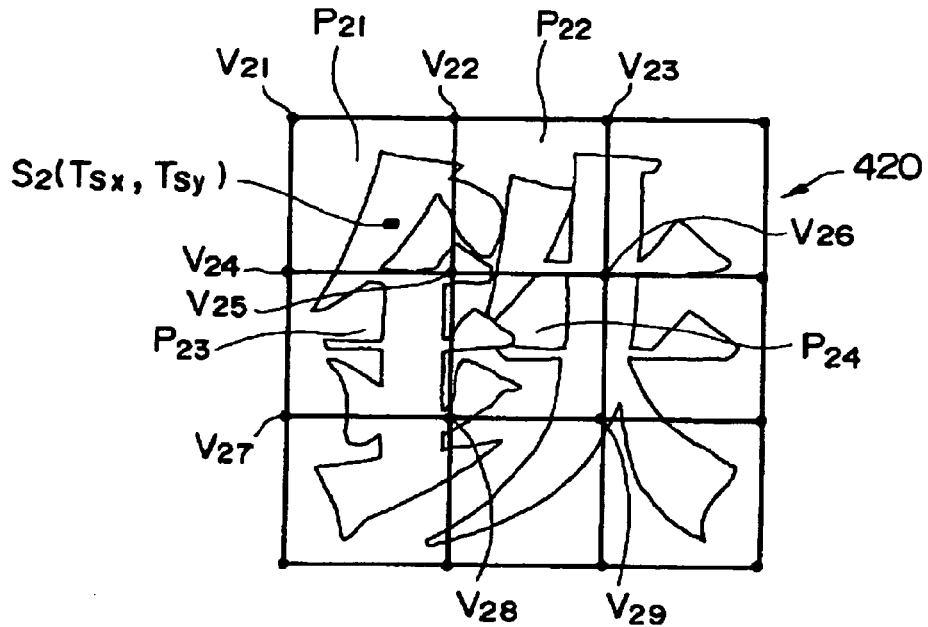
FIGS. 13A and 13B are illustrative of another example of the method used for mapping a texture onto a distorted object.
Figure 13B:
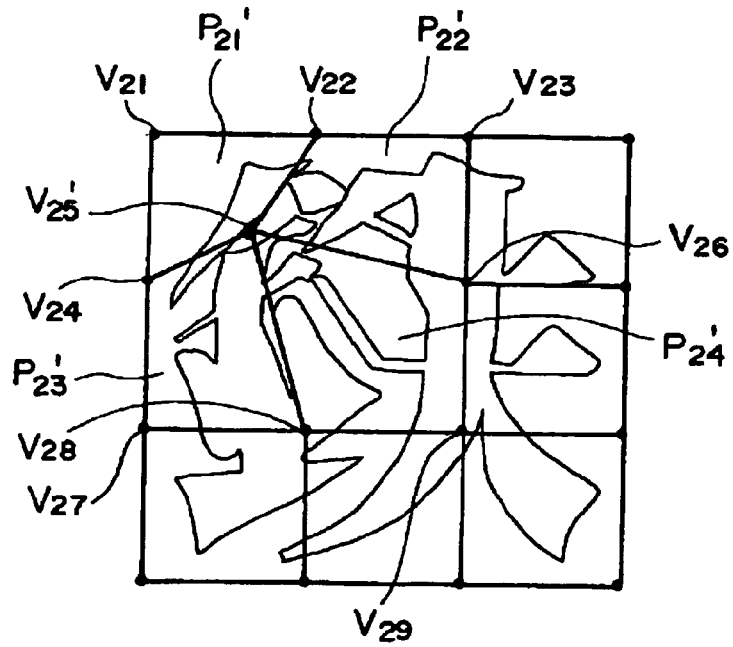

Another method of mapping a texture onto a distorted object is illustrated in FIGS. 13A and 13B. reference number 430 in FIG. 13A shows a situation in which a texture image representing the Chinese character for "iron" has been mapped onto a plurality of divided polygonal objects.

$V_{21}$ to $V_{29}$ denote the vertices of the polygonal objects, $P_{21}$ denotes a polygonal surface having the vertices $V_{21}V_{22}V_{25}V_{24}$, $P_{22}$ denotes a polygonal surface having the vertices $V_{22}V_{23}V_{26}V_{25}$, $P_{23}$ denotes a polygonal surface having the vertices $V_{24}V_{25}V_{28}V_{27}$, and $P_{24}$ denotes a polygonal surface having the vertices $V_{25}V_{26}V_{29}V_{28}$.

When a method is used to define texture coordinates for mapping in accordance with the vertices of each polygon, in a manner similar to that shown in FIGS. 12A and 12B, texture coordinates $(T_{5x}, T_{5y})$ are assumed to correspond to the vertex $V_{25}$ that is used in common by the polygons $P_{21}$ to $P_{24}$.

Assume that a point $S_2$ on the polygon $P_{21}$ has been subjected to an impact and the vertex $V_{25}$ has moved to $V_{25}'$. Assume that the texture coordinates corresponding to $S_2$ are $(T_{sx}, T_{sy})$ (see FIG. 13A).

The texture mapping that is performed on the distorted polygons $P_{21}'$ to $P_{24}'$ in this case, using the texture coordinates $(T_{5x}, T_{5y})$ for the point $S_2$ as the texture coordinates corresponding to $V_{25}'$, are shown in FIG. 13B. Since the distortion of the texture image is comparatively small in comparison with that of FIG. 13B, this prevents excessive distortion and enables a more realist representation of the distortion of the object due to the impact.

The relationship between the coarseness of the surface-specifying points and distortion will now be discussed.

Figure 14A:
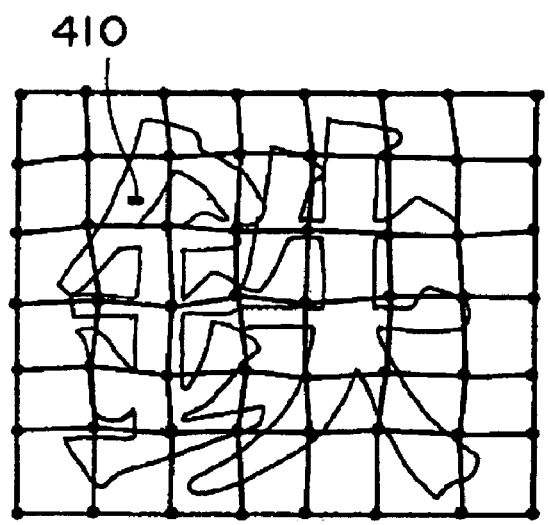
FIGS. 14A and 14B illustrate the status of an object before and after distortion, when the surface-specifying points are densely distributed.
Figure 14B:
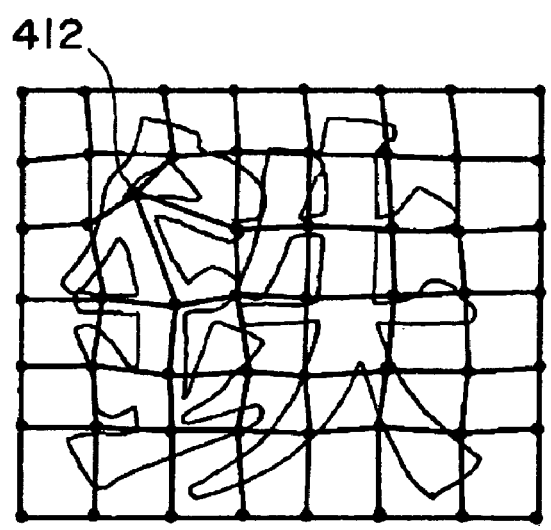

The status of an object before and after distortion when surface-specifying points are densely distributed, is shown in FIGS. 14A and 14B. Assume that reference number 410 in FIG. 14A denotes an impact and a surface-specifying point has moved to a distortion point 412 in FIG. 14B.

If the surface-specifying points are distributed densely, the surface area of each primitive surface defined by the surface-specifying points becomes smaller. Since distortion is in primitive surface units with this embodiment of the present invention, the surface area of distortion becomes smaller as the surface area of the primitive surfaces becomes smaller. This makes it possible to represent subtle distortion and complicated distortion in a pleasing manner.

Figure 15A:
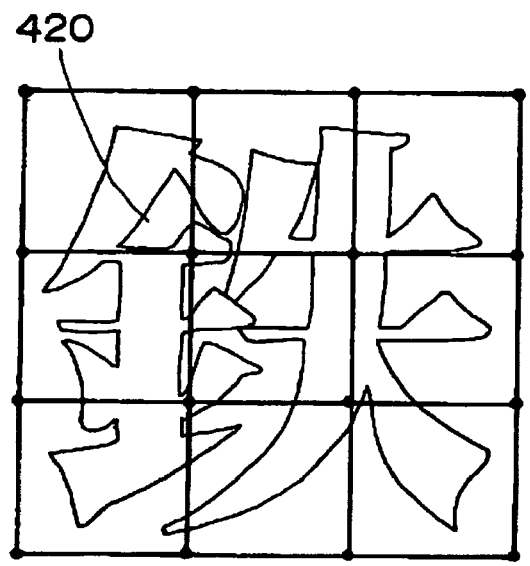
FIGS. 15A and 15B illustrate the status of an object before and after distortion, when the surface-specifying points are sparsely distributed.
Figure 15B:
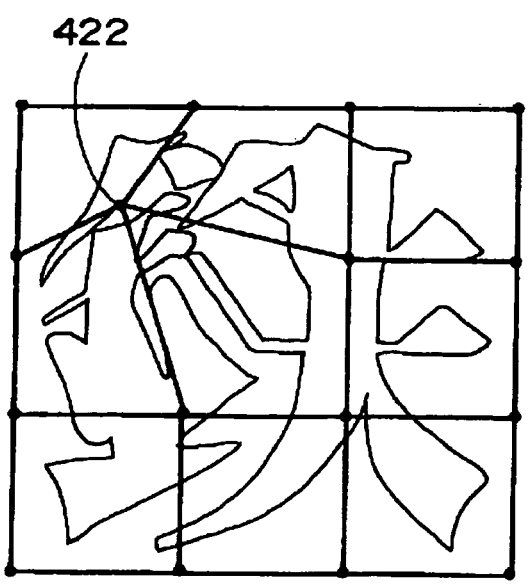

The status of an object before and after distortion when surface-specifying points are sparsely distributed, is shown in FIGS. 15A and 15B. Assume that reference number 420 in FIG. 15A denotes an impact and a surface-specifying point has moved to a distortion point 422 in FIG. 15B.

If the surface-specifying points are distributed sparsely, the surface area of each primitive surface defined by the surface-specifying points becomes greater. Since distortion is in primitive surface units with this embodiment of the present invention, the surface area of distortion becomes greater as the surface area of the primitive surfaces becomes greater. This makes it possible to represent subtle distortion and complicated distortion in a pleasing manner.

The description now turns to shading that is used to emphasize indentations created by the distortion of an object.

Figure 16A:
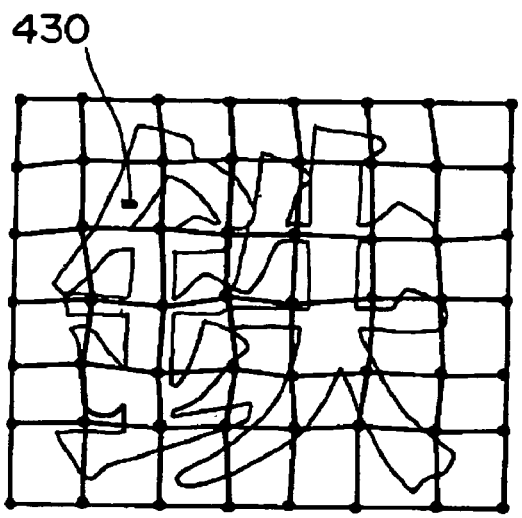
FIGS. 16A and 16B are illustrative of the shading processing used for emphasizing an indentation caused by the distortion of an object.
Figure 16B:
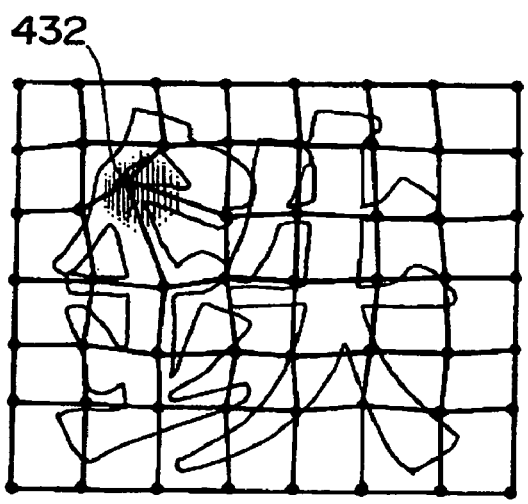

Assume that reference number 430 in FIG. 16A denotes an impact and a surface-specifying point has moved to a distortion point 432 in FIG. 16B. In this case, it is preferable to apply shading so that the periphery of the surface-specifying point 432, which has been moved by the distortion, appears darker. This makes it possible to create game images that emphasize the indentation caused by an impact.

3. Hardware Configuration

Figure 17:
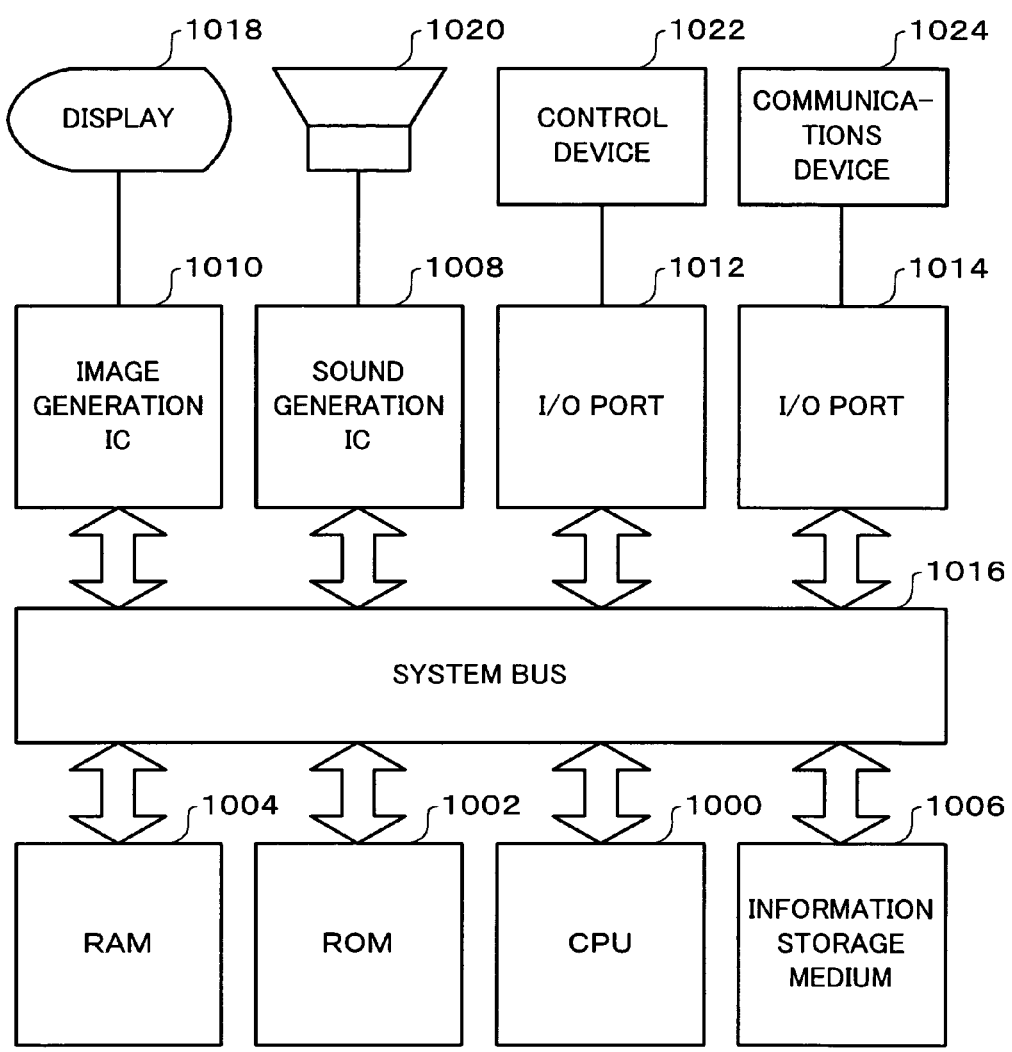
FIG. 17 shows an example of the configuration of hardware that can implement the embodiment of the present invention.

The description now turns to an example of hardware that can implement this invention, with reference to FIG. 17. In the system shown in this figure, a CPU 1000, ROM 1002, RAM 1004, an information storage medium 1006, a sound generation IC 1008, an image generation IC 1010, and I/O ports 1012 and 1014 are connected together by a system bus 1016 in such a manner that data can be mutually transferred therebetween. A display 1018 is connected to the image generation IC 1010, a speaker 1020 is connected to the sound generation IC 1008, a control device 1022 is connected to the I/O port 1012, and a communications device 1024 is connected to the I/O port 1014.

The information storage medium 1006 is mainly used for storing a program together with image data, sound data, or the like for representing display objects. Means such as a DVD, game cassette, or CD-ROM could be used as an information storage medium for storing a game program and other data for a domestic game machine. Alternatively, memory such as ROM could be used for an arcade game machine, in which case the information storage medium 1006 is the ROM 1002.

The control device 1022 is equivalent to a game controller or operating panel and it is used as a device for inputting into the main unit of the system the results of decisions made by the player as the game progresses.

The CPU 1000 controls the entire system and processes data in accordance with the game program stored in the information storage medium 1006, a system program stored in the ROM 1002 (including initialization information for the entire system), and signals input through the control device 1022. The RAM 1004 is a storage means that is used as a work space for the CPU 1000, and specific details from the information storage medium 1006 or the ROM 1002, or the results of calculations by the CPU 1000, are stored therein. A data configuration having a logical structure suitable for implementing this embodiment of the invention is constructed within this RAM or information storage medium.

The provision of the sound generation IC 1008 and the image generation IC 1010 in this type of system makes it possible to output game sounds and game images as required. The sound generation IC 1008 is an integrated circuit device that generates game sounds such as sound effects and background music, based on information stored in the information storage medium 1006 or the ROM 1002, and the thus generated game sounds are output by the speaker 1020. The image generation IC 1010 is an integrated circuit device that generates pixel information for output to the display 1018, based on image information that is sent from components such as the RAM 1004, the ROM 1002, and the information storage medium 1006. Note that a device called a head-mounted display (HMD) could also be used as the display 1018.

The communications device 1024 is designed to transfer various types of information used within the game system to and from external devices, and it is used to send given information in accordance with a game program when connected to another game system, or to send information such as a game program over a communications line.

The processing described with reference to FIGS. 1 to 16B is implemented by components such as the information storage medium 1006 that contains information such as a program and data, the CPU 1000 that operates in accordance with that information, and the image generation IC 1010 or the sound generation IC 1008. Note that the processing executed by the image generation IC 1010 and the sound generation IC 1008 could be performed in a software manner by means such as the CPU 1000 or an ordinary DSP.

When this embodiment of the present invention is applied to an arcade game system such as that shown in FIG. 1, components such as a CPU, an image generation IC, and a sound generation IC are mounted on an internal system board (circuit board) 1106. Information for implementing the processing of this embodiment of the invention (the means of the present invention) is stored in a semiconductor memory 1108 that is an information storage medium on the system board 1106. This information is hereinafter called stored information.

Figure 18A:
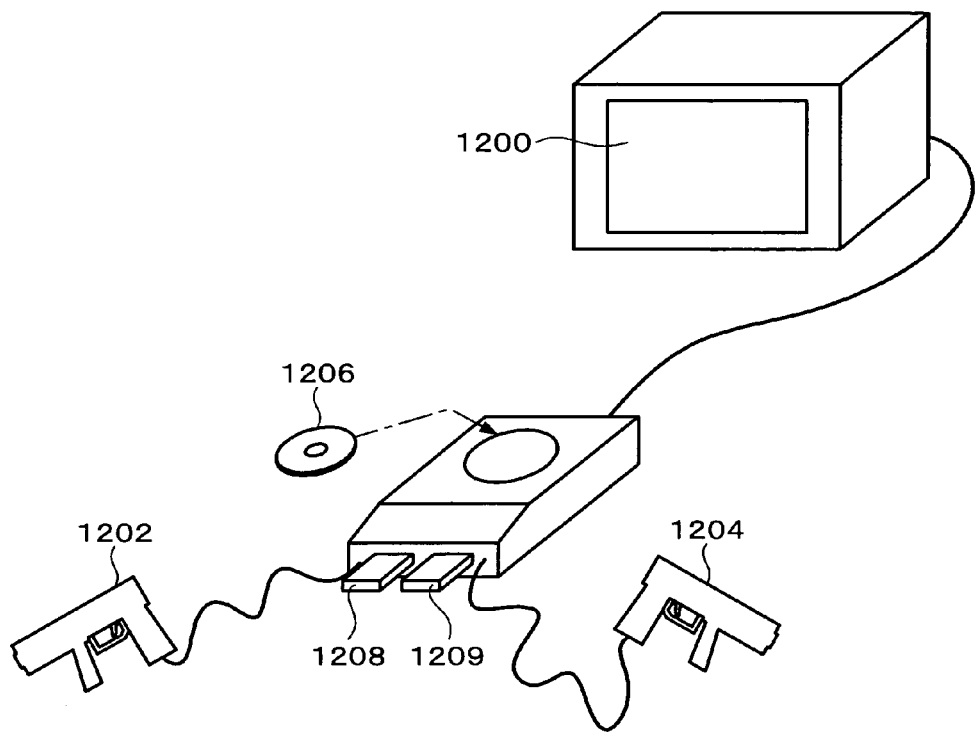
FIGS. 18A and 18B show examples of various different systems to which the embodiment of the present invention can be applied.

An example of this embodiment of the invention applied to a domestic game machine is shown in FIG. 18A. Players enjoy the game by manipulating game controllers 1202 and 1204 while viewing a game image shown on a display 1200. In this case, the above described stored information is stored in a CD-ROM 1206 or memory cards 1208 and 1209, which are information storage media that can be freely inserted into and removed from the main unit of the system.

Figure 18B:
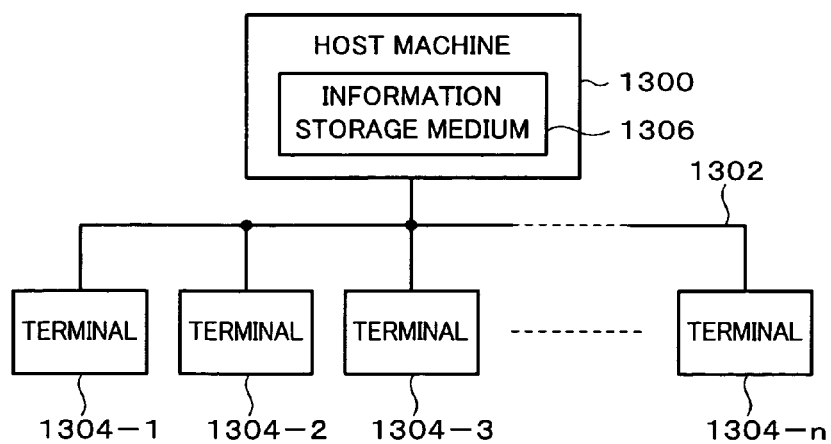

An example of this embodiment applied to an image generation system is shown in FIG. 18B, where the image generation system comprises a host device 1300 and terminals 1304-1 to 1304-n that are connected to the host device 1300 by communications lines 1302 (a small-area network such as a LAN or a large-area network such as the Internet). In this case, the above described stored information is stored in an information storage medium 1306 such as a magnetic disk device, magnetic tape device, or semiconductor memory that can be controlled by the host device 1300. Each of the terminals 1304-1 to 1304-n has a CPU, an image generation IC, and a sound processing IC. IC. In addition, if game images and sounds can be generated by the terminals 1304-1 to 1304-n in a stand-alone manner, means such as a game program for generating game images and sounds is transferred thereto from the host device 1300. If game images and sounds cannot be generated in a stand-alone manner by the terminals 1304-1 to 1304-n, on the other hand, the host device 1300 creates them then transfers them to those terminals for output thereby.

Note that the processing of this invention in the configuration shown in FIG. 18B could also be divided between the host device (server) and the terminals. Similarly, the above described stored information used for implementing this invention could be divided between an information storage medium on the host device (server) and information storage media of the terminals.

In addition, the terminals connected by the communications lines could be either those of domestic game systems or those of arcade game systems. If arcade game systems are connected by communications lines, it is preferable to use portable information storage devices (memory cards or hand-held game machines) that can exchange information with arcade game systems and also exchange information with domestic game systems.

Note that this invention is not limited to the above described embodiments and thus it can be implemented in various other ways.

For example, the description above related to examples in which only the vertex nearest the location of the impact moved, but the present invention is not limited thereto. A plurality of vertices could be made to move, by way of example.

In addition, the description related to the extraction of the vertex nearest the impact point as the vertex to be moved, but the present invention is not limited thereto. The movement could be such that a plurality of vertices within a predetermined range from the impact point are moved in accordance with their original distance from the impact point, by way of example.

This embodiment of the invention was described by way of example as relating to the use of polygonal surfaces as primitive surfaces, but it is not limited thereto. The primitive surfaces could equally well have another shape, such as a free curved surface.

This embodiment of the present invention was also described as relating to an example in which a bullet imparted an impact to an object, but the invention is not limited thereto. For example, the impact could be that on a vehicle body caused by collision with a car in a driving game, or a temporary swelling on a muscle during a hand-to-hand combat game.

Furthermore, the present invention was described as relating to a case in which a steel plate receives an impact, but it is not limited thereto. It can relate to anything that distorts without breaking when subjected to an impact.

The present invention can be applied to various games other than gun-fighting games (such as shooting games that are not gun-fighting games, hand-to-hand combat games, robot-battling games, sports games, competitive games, role-playing games, instrument-playing games, and dance games).

This invention is also not limited to arcade and domestic game systems; it can be applied to various other game systems such as large-scale attractions in which many players can participate, simulators, multimedia terminals, image generation systems, and system boards that create game images.

The invention claimed is:

1. A computer-usable program embodied on an information storage medium, in which information for controlling an image generation system which generates a three-dimensional image of an object formed by a primitive surface is stored, the program comprising information necessary for implementing:

hit check processing means for determining whether an object has been hit in sequence;

impact computation means which computes an impact position at which an impact is imparted to the object hit in sequence in real-time;

distortion computation means which performs computations for each impact to the object for causing distortion of the primitive surface in a vicinity of the impact position at which each impact is imparted to the object in sequence in real-time; and image generation means which generates an image of the object formed by the primitive surface that has been distorted after the each impact was imparted to the object, wherein the distortion computation means comprises:

means which computes at least one distortion point for specifying a three-dimensional shape of the primitive surface that is distorted by the impact, the at least one distortion point corresponding to the impact point; and point-to-be-moved determination means which determines at least one of surface-specifying points determined by a distance from the impact point to be moved to the computed distortion point, the surface-specifying points being distributed over the surface of the object or in a vicinity of the object for defining the primitive surface that forms the object.

2. The program as defined in claim 1, wherein the distortion computation means further comprises:

means which causes the position of the thus-determined at least one surface-specifying point to move to the at least one distortion point;

wherein the image generation means comprises information necessary for specifying the primitive surface based on the surface-specifying point that has been moved and for generating an image.

3. The program as defined in claim 2, wherein the impact computation means further comprises means which calculates the magnitude and direction of the impact imparted to the object; and wherein the program comprises information necessary for calculating the at least one distortion point from at least one of the impact position and the magnitude and direction of the impact.

4. The program as defined in claim 2, the program further comprising information necessary for distributing the surface-specifying points in a predetermined density.

5. The program as defined in claim 2, further comprising information necessary for distributing the surface-specifying points in an arrangement that deviates in a random manner from grid points.

6. A computer-usable program embodied on an information storage medium, in which information for controlling an image generation system which generates a three-dimensional image of an object formed by a primitive surface is stored, the program further comprising information necessary for implementing:

hit check processing means for determining whether an object has been hit in sequence;

impact computation means which computes an impact position at which an impact is imparted to the object hit in sequence in real-time;

distortion computation means which performs computations for each impact to the object for causing distortion of the primitive surface in a vicinity of the impact position at which the each impact is imparted to the object in sequence in real-time;

image generation means which generates an image of the object formed by the primitive surface that has been distorted after the each impact was imparted to the object; and adjusting means which adjusts the density of distribution of the surface-specifying points in accordance with a magnitude of distortion of the object due to an impact, wherein the distortion computation means comprises:

means which computes at least one distortion point for specifying a three-dimensional shape of the primitive surface that is distorted by the impact, the at least one distortion point corresponding to the impact point; and point-to-be-moved determination means which determines at least one of surface-specifying points determined by a distance from the impact point to be moved to the computed distortion point, the surface-specifying points that are distributed over the surface of the object or in a vicinity of the object for defining the primitive surface that forms the object, and the magnitude of distortion due to the impact is determined by at least one of a material of the object subjected to the impact and a type of the impact.

7. The program as defined in claim 2, further comprising information necessary for ensuring that the point-to-be-moved determination means determines a surface-specifying point in the vicinity of the impact position as a point to be moved.

8. The program as defined in claim 2, further comprising information necessary for distributing the surface-specifying points in real-time after the object has been subjected to an impact.

9. The program as defined in claim 8, further comprising information necessary for determining at least one of the range and density of distribution of the surface-specifying points in accordance with an impact that has been imparted to the object.

10. The program as defined in claim 2, further comprising information necessary for:

implementing texture mapping computation means which performs computations necessary for mapping a texture onto the primitive surface that has been distorted by an impact; and causing the texture mapping computation means to perform texture mapping processing, using texture coordinates that corresponded to the surface-specifying point before movement, even when the surface-specifying point has been moved by an impact.

11. The program as defined in claim 2, further comprising information necessary for:

implementing texture mapping computation means which performs computations necessary for mapping a texture onto the primitive surface that has been distorted by an impact; and causing the texture mapping computation means to perform texture mapping processing, using texture coordinates which correspond to the impact position and are related to the surface-specifying point that has been moved by an impact.

12. The program as defined in claim 2, further comprising information necessary for performing image generation for an object formed by polygonal surfaces having the surface-specifying points as vertices.

13. The program as defined in claim 2, further comprising information necessary for implementing means which performs image generation by using a polygonal object having the surface-specifying points as vertices, and performs shading processing in such a manner that the vicinity of the vertices after a movement is darker, when the vertices have been moved by an impact.

14. A computer-usable program embodied on an information storage medium, in which is stored information for controlling an image generation system which generates a three-dimensional image of an object formed by a polygonal surface; the program comprising information necessary for implementing:

hit check processing means for determining whether an object has been hit in sequence;

object information storage means which stores information on the object formed by the polygonal surface having vertices that are a plurality of points distributed over the surface of the object at a predetermined density;

point-to-be-moved determination means that operates when each impact is imparted to the object, for determining at least one vertex determined by a distance from an impact position to be moved to at least one distortion point for specifying a three-dimensional shape of the vertices, the at least one distortion point corresponding to the imparted impact position at which an impact is imparted to the object hit in sequence in real-time;

means which causes the vertex to move to the at least one distortion point, based on the magnitude and direction of the impact imparted to the object; and image generation means which generates an image of the object after a distortion caused by the impact, using the vertex that has been moved.

15. A game method which generates a three-dimensional image of an object formed by a primitive surface, the game method comprising:

performing hit check processing to determine whether an object has been hit in sequence;

computing an impact position at which an impact is imparted to the object hit in sequence in real-time;

performing computations for each impact to the object for causing distortion of the primitive surface in a vicinity of the impact position at which each impact is imparted to the object in sequence in real-time; and generating an image of the object formed by the primitive surface that has been distorted after each impact was imparted to the object, wherein the performing computations step comprises determining at least one distortion point for specifying a three-dimensional shape of the primitive surface that is distorted by the impact, the at least one distortion point corresponding to the impact point, and determining at least one of surface-specifying points determined by a distance from the impact point to be moved to the at least one distortion point, the surface-specifying points being distributed over the surface of the object or in a vicinity of the object for defining the primitive surface that formed the object.

16. The game method as defined in claim 15, wherein the performing computations step further comprises:

computing the at least one distortion point for specifying the shape of the primitive surface that is distorted by the impact; and causing a position of the determined surface-specifying point to move to the distortion point; and wherein the generating step further comprises specifying the primitive surface based on the surface-specifying point that has been moved and generating an image.

17. The game method as defined in claim 16, wherein the computing an impact position step further comprises calculating the magnitude and direction of the impact imparted to the object; and wherein the computing at least one distortion point step comprises calculating the at least one distortion point from at least one of the impact position and a magnitude and a direction of the impact.

18. The game method as defined in claim 16, wherein the surface-specifying points are distributed in a predetermined density.

19. The game method as defined in claim 16, wherein the surface-specifying points are distributed in an arrangement that deviates in a random manner from grid points.

20. A game method which generates a three-dimensional image of an object formed by a primitive surface, the game method comprising:

performing hit check processing to determine whether an object has been hit in sequence;

computing an impact position at which an impact is imparted to the object hit in sequence in real-time;

performing computations for each impact to the object for causing distortion of the primitive surface in a vicinity of the impact position at which each impact is imparted to the object in sequence in real-time; and generating an image of the object formed by the primitive surface that has been distorted by each impact imparted to the object, wherein the performing computations step comprises determining at least one distortion point for specifying a three-dimensional shape of the primitive surface that is distorted by the impact, the at least one distortion point corresponding to the impact point, and determining at least one of surface-specifying points determined by a distance from the impact point to be moved to the at least one distortion point, the surface-specifying points being distributed over the surface of the object or in a vicinity of the object for defining the primitive surface forming the object, a density of distribution of the surface-specifying points is adjusted in accordance with a magnitude of distortion of the object due to an impact, and the magnitude of distortion of the object due to the impact is determined by at least one of a material of the object subjected to the impact and a type of the impact.

21. The game method as defined in claim 16, wherein the point-to-be-moved determination means determines a surface-specifying point in the vicinity of the impact position as a point to be moved.

22. The game method as defined in claim 16, wherein the surface-specifying points are distributed in real-time after the object has been subjected to an impact.

23. The game method as defined in claim 22, wherein at least one of the range and density of distribution of the surface-specifying points is determined in accordance with an impact that has been imparted to the object.

24. The game method as defined in claim 16, further comprising performing computations necessary for mapping a texture onto the primitive surface that has been distorted by an impact, including performing texture mapping processing, using texture coordinates that corresponded to the surface-specifying point before movement, even when the surface-specifying point has been moved by an impact.

25. The game method as defined in claim 16, further comprising performing computations necessary for mapping a texture onto the primitive surface that has been distorted by an impact, including performing texture mapping processing, using texture coordinates which correspond to the impact position and are related to the surface-specifying point that has been moved by an impact.

26. The game method as defined by claim 16, wherein image generation is performed for an object formed by polygonal surfaces having the surface-specifying points as vertices.

27. The game method as defined in claim 16, further comprising:

performing image generation by using a polygonal object having the surface-specifying points as vertices, and performing shading processing in such a manner that the vicinity of the vertices after movement is darker, when the vertices have been moved by an impact.

28. A game method which generates a three-dimensional image of an object formed by a polygonal surface, the method comprising:

storing information on the object formed by the polygonal surface having vertices that are a plurality of points distributed over the surface of the object at a predetermined density;

performing hit check processing to determine whether the object has been hit in sequence;

determining at least one vertex determined by a distance from an impact position to be moved to at least one distortion point for specifying a three-dimensional shape of the vertices, the at least one distortion point corresponding to the imparted impact position at which an impact is imparted to the object hit in sequence in real-time;

moving the vertex to the at least one distortion point, based on the magnitude and direction of the impact imparted to the object; and generating an image of the object after a distortion caused by the impact, using the vertex that has been moved.

* * * * *